(12) United States Patent
Christensen

(10) Patent No.: US 8,641,010 B2
(45) Date of Patent: Feb. 4, 2014

(54) VALVE WITH A SOLENOID FIXED TO A PLUNGER TUBE BY A YOKE

(75) Inventor: Ole Holst Christensen, Kolding (DK)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 13/144,177

(22) PCT Filed: Jan. 11, 2010

(86) PCT No.: PCT/DK2010/000004
§ 371 (c)(1),
(2), (4) Date: Sep. 12, 2011

(87) PCT Pub. No.: WO2010/081474
PCT Pub. Date: Jul. 22, 2010

(65) Prior Publication Data
US 2011/0309277 A1    Dec. 22, 2011

(30) Foreign Application Priority Data

Jan. 13, 2009   (DK) .................................. 2009 00051

(51) Int. Cl.
*F16K 31/02*   (2006.01)
(52) U.S. Cl.
USPC ................. 251/129.15; 335/270; 335/278
(58) Field of Classification Search
USPC .................... 251/129.15; 335/270, 278
See application file for complete search history.

(56) References Cited

U.S. PATENT DOCUMENTS

| 2,627,544 | A | | 2/1953 | Eck |
| 3,262,027 | A | * | 7/1966 | Zaleske et al. ............... 335/261 |
| 3,295,079 | A | * | 12/1966 | Brown .......................... 335/255 |
| 3,350,974 | A | | 11/1967 | Brown |
| 3,565,111 | A | * | 2/1971 | Pearson .................... 137/596.17 |
| 3,593,240 | A | * | 7/1971 | Garczynski .................... 335/249 |
| 3,856,260 | A | | 12/1974 | Giordana |
| 4,728,916 | A | * | 3/1988 | Fontecchio et al. ............ 335/255 |
| 5,538,220 | A | * | 7/1996 | LaMarca .................. 251/129.15 |
| 6,086,042 | A | * | 7/2000 | Scott et al. ............... 251/129.15 |
| 6,184,766 | B1 | * | 2/2001 | Kojima et al. ................. 335/255 |

(Continued)

FOREIGN PATENT DOCUMENTS

DE       2337886 A1    2/1975
DE       35 37 435 A1  4/1987

(Continued)

OTHER PUBLICATIONS

International Search Report for Serial No. PCT/DK2010/000004 dated Apr. 22, 2010.

*Primary Examiner* — John K Fristoe, Jr.
*Assistant Examiner* — Matthew W Jellett
(74) *Attorney, Agent, or Firm* — McCormick, Paulding & Huber LLP

(57) ABSTRACT

The invention provides a valve comprising a tube for guiding movement of a plunger, a solenoid which can be arranged about the tube, and a yoke which can be positioned in an operational position relative to the tube and relative to the solenoid so that it provides a magnetic path between the solenoid and portions of the tube. The yoke engages the tube and thereby prevents removal of the solenoid from tube. The invention thereby provides a very simple valve design with a low amount of components. The invention further provides a method of making a valve including fixing a solenoid to a tube by use of a yoke which engages the tube.

10 Claims, 17 Drawing Sheets

(56) References Cited

U.S. PATENT DOCUMENTS 6,219,903 B1 * 4/2001 Osterhart et al. .......... 29/602.1
6,459,348 B1    10/2002 Birkelund
6,633,216 B2 * 10/2003 Lewin et al. .................. 335/220

FOREIGN PATENT DOCUMENTS

| | | |
|---|---|---|
| JP | 11-248022 A | 9/1999 |
| WO | 96/12906 A1 | 5/1996 |
| WO | 2009/003475 A1 | 1/2009 |

* cited by examiner

VALVE WITH A SOLENOID FIXED TO A PLUNGER TUBE BY A YOKE

CROSS REFERENCE TO RELATED APPLICATIONS

This application is entitled to the benefit of and incorporates by reference essential subject matter disclosed in International Patent Application No. PCT/DK2010/000004 filed on Jan. 11, 2010 and Danish Patent Application No. PA 2009 00051 filed Jan. 13, 2009.

FIELD OF THE INVENTION

The present invention relates to a valve comprising a tube for guiding movement of a plunger, a solenoid which can be arranged about the tube, and a yoke which can be positioned in an operational position relative to the tube and relative to the solenoid so that it provides a magnetic path between the solenoid and end-portions of the tube.

BACKGROUND OF THE INVENTION

In valves of the above mentioned kind, the plunger, sometimes referred to as an armature, interacts with a closure member which controls fluid flow in a flow path through the valve. The valve is therefore electrically operable via the solenoid arranged about the tube.

An electromagnetic actuator for a valve is disclosed e.g. in U.S. Pat. No. 6,459,348 in which an axially introduced guide tube for a movable armature is held in a cavity of the actuator by use of spring force from a wire spring. The spring is located internally within the actuator.

Actuators for valves typically comprise a solenoid and a yoke which partly surrounds the solenoid to conduct a magnetic field to a desired location along the guide tube and thereby to ensure correct movement of the plunger or armature in the tube. The yoke is sometimes fixed inseparably to the solenoid, c.f. the abovementioned US-patent in which a capsule covers the solenoid and the yoke. This simplifies the design, maintains the yoke in correct position, and may further provide a desired appearance of the actuator. It may, however, sometimes be desired to provide the yoke as a separate part, or even to facilitate replacement of the yoke.

U.S. Pat. No. 2,627,544 discloses the assembly of a yoke, a solenoid and a tube by use of a separate split ring.

SUMMARY OF THE INVENTION

It is an object of the invention to provide a simpler and potentially more reliable valve. According to a first aspect, the invention provides a valve of the kind mentioned in the introduction wherein the yoke comprises an elastically deformable structure allowing elastic deformation of the yoke to facilitate engaging between the yoke and the tube and thus to prevent removal of the solenoid and the yoke from the tube, and wherein the yoke forms a lower leg, an intermediate portion and an upper leg, the lower and upper legs both forming openings being aligned to form a passage for the tube through both openings.

By "prevent" is herein meant that the yoke, by its engagement with the tube, limits the ability of the solenoid to be removed from the tube. That is, the engagement between the yoke and the tube must be partly or completely removed before the solenoid can be removed from the tube.

Since the yoke itself prevents removal of the solenoid from the tube, the valve is very easy to assemble and take apart without use of separate springs or similar component which may be capable of fixing the yoke to the solenoid and tube. Such separate components may complicate the design and they inevitably introduce an additional potential reason for damage. During assembly or separation of the solenoid and yoke from the tube, the separate component may become lost, or it may accidentally be substituted with a similar component for a valve of a different size etc. Accordingly, the invention provides a simpler and potentially more reliable valve.

By engage is herein meant any kind of contact between the yoke and the tube by which movement of the yoke relative to the tube is limited or hindered. The engagement may e.g. be between a protrusion and a depression provided in the tube and yoke or the engagement may simply be between a surface of the yoke being pressed against a surface of the tube so that movement is limited by friction between the surfaces.

The yoke may be formed from an oblong sheet of magnetically conductive metal which is bent and forms the shape of a "U". In the following description, the left upward leg of the U-shape is referred to as the "lower leg", the right upward leg is referred to as the "upper leg" and the horizontal component of the U-shape is referred to as the "mid section".

The lower and upper legs both form an opening which defines a passage for the tube to extend through the yoke.

The yoke comprises any kind of elastically deformable structure so that the tube can be engaged by the yoke. The deformable structure may further enable subsequent release of the yoke from the tube if disassembly of the valve is desired. The elastic deformability could be provided by a slit or similar perforated structure of the yoke.

In one embodiment, the tube is received in an opening through the yoke, where elastic properties of the yoke provides a variable dimension of the opening and therefore allows, in an expanded state of the opening, insertion of the tube in the opening and, in a less expanded state of the opening, engagement between the edge of the opening and the tube.

In particular, the yoke may comprise a locking structure arranged such that it, in the operational position, can enter into a recess in the tube and thereby prevent movement of the tube relative to the yoke.

The locking structure may have a free end which extends towards the opening in one of the legs, e.g. the upper leg. The free end could be elastically deformable so that it may bend outwardly away from the upper and lower legs when the tube is received in the passage formed by the openings in the upper and lower legs, and so that the free end can engage into a recess or groove when the tube reaches the operational position in the passage.

The free end may have the shape of a pawl, and the pawl may, in one embodiment, extend partly towards the opening in the upper leg and partly upwards in a direction away from the lower and upper legs. In that way, the pawl may facilitate easier sliding of the tube into the passage and, simultaneously, it may better prevent movement of the tube in the opposite direction out of the passage.

The free end of the locking structure may also be formed by an edge of the yoke around one or both of the openings in the lower and/or the upper leg. As an example, the periphery around the opening in one of the legs may be made from an elastically deformable material so that the area of the opening can be increased by elastic deformation when the tube is inserted through the passage formed by the openings in the lower and upper legs. When the periphery around an elastically deformed opening reaches a groove or indentation in the tube, the area of the opening may decrease be partly or completely relaxation of the expanded edge around the opening whereby the yoke engages the tube.

The yoke, including the locking structure, may be formed in one part, e.g. from a single blank or piece of a sheet of metal, or the locking structure may be formed by a separate part which is attached to the remaining portion of the yoke.

Generally, the yoke is of a magnetically conductive material, but if the locking structure is a separate part, it may be formed from other materials including plastic.

When the yoke is prevented from moving along the tube, it simultaneously fixes the solenoid to the tube. This feature may be obtained e.g. by fixing the yoke to the solenoid by a fixing structure, e.g. a structure of the yoke which engages a structure of the solenoid. The solenoid may also be fixed by arranging the yoke about the solenoid, i.e. with one of the legs on opposite sides of the solenoid.

In one embodiment, the arrangement of the solenoid about the tube may be enabled by a solenoid which comprises a passage through which the tube may extend. In this embodiment, the yoke may easily fix the solenoid on the tube by hindering movement of the solenoid along the tube, e.g. by arranging the yoke with the upper and lower legs on opposite sides of the solenoid and with the tube extending through openings in these two legs. In this way, the solenoid becomes fixed to the tube when the yoke is prevented from moving along the tube.

In one embodiment, the engagement between the yoke and the tube allows movement of the yoke along the tube by sliding of the tube in the aforementioned openings in the upper and lower legs of the yoke. In this case, the engagement, however, prevents removal of the yoke from the tube by introducing an upper limit-point above which the yoke are prevented from sliding.

The locking structure may be sufficiently elastically deformable to enable movement of the locking structure into and out of the engagement with the tube. In this way, the yoke may, in a released state, become movable relative to the tube or become movable beyond the aforementioned limit-point. In the released state, the solenoid may therefore become released from the tube which is practical for maintenance or refitting purpose, e.g. if the solenoid must be renewed on a valve which is fixed in a flow system.

In the operational position, the free end of the tube may extend in a direction away from both the lower and upper leg and upwardly from an upper opening in the upper leg of the yoke. In this case, the locking structure may be arranged at the upper opening.

To provide elasticity and thus allow sufficient elastic deformation to allow the locking structure to move into and out of engagement with the tube, the yoke may form a slit extending between the mentioned openings in the lower and upper legs.

In a second aspect, the invention provides a method of making a valve in accordance with the first aspect of the invention.

DETAILED DESCRIPTION OF THE PREFERRED EMBODIMENTS

FIGS. 1-4 illustrate an embodiment of the invention. The valve 1 comprises a tube 2 for guiding movement of a plunger (not shown) inside the tube 2. A solenoid 3 is arranged about the tube, and a yoke 4 is in an operational position relative to the tube 2 and solenoid 3.

The plunger operates a valve member which controls a flow through a flow conduit 5

Figure 1:
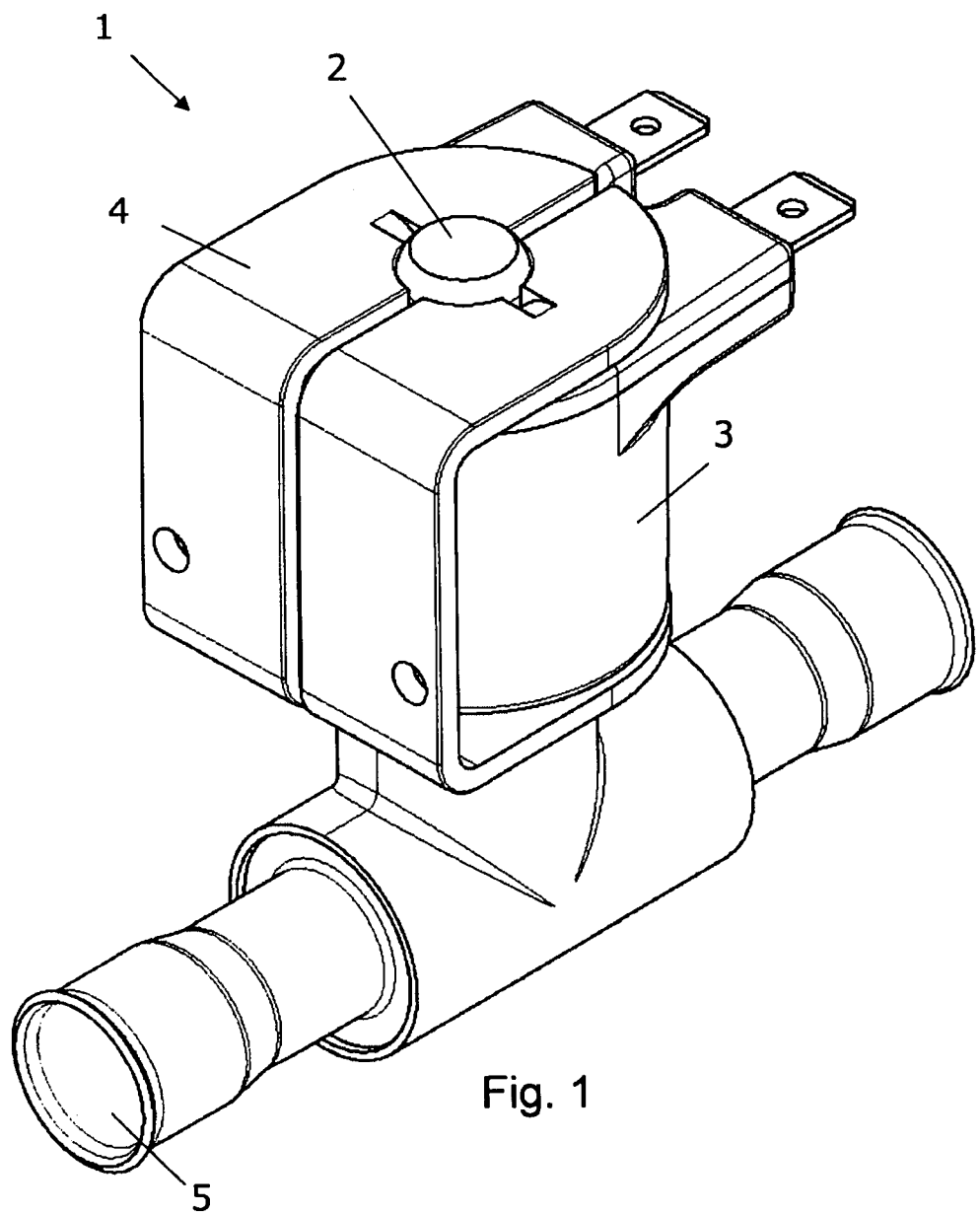
FIG. 1 illustrates a valve according to the invention.
Figure 2:
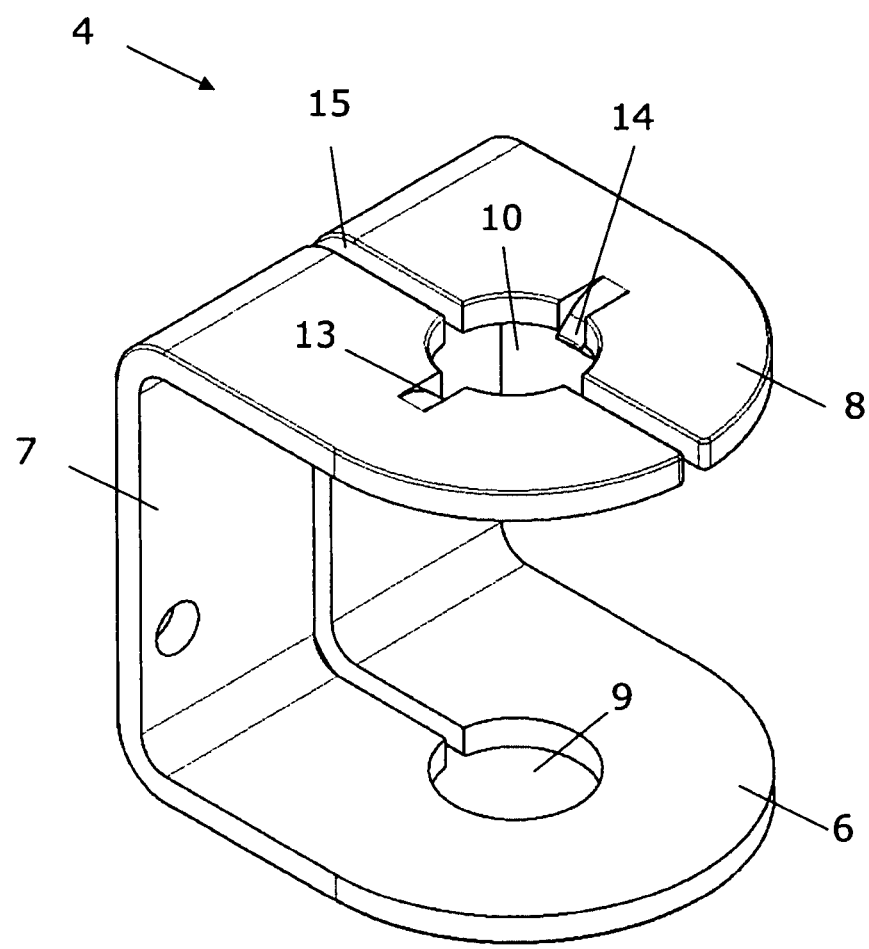
FIG. 2 illustrates an embodiment in which the yoke forms teeth's and a slit extending through the yoke.

In FIG. 2, the yoke 4 is illustrated without the rest of the valve. The yoke comprises a lower leg 6, an intermediate portion 7 and an upper leg 8. Two openings 9, 10 formed as through holes, and they are aligned so that they form a passage for the tube 2. When the solenoid is arranged between the two legs 6, 8, and the tube is arranged in the passage through the openings 9, 10, the yoke 4 provides a magnetic path between the solenoid 3 and portions of the tube. The solenoid forms a passage which, in the operational position, is in line with the passage formed by the openings 9, 10 in the yoke 4 so that the tube 2 can extend from one opening 9 through the passage in the solenoid and through the other opening 10 in the yoke.

Figure 3:
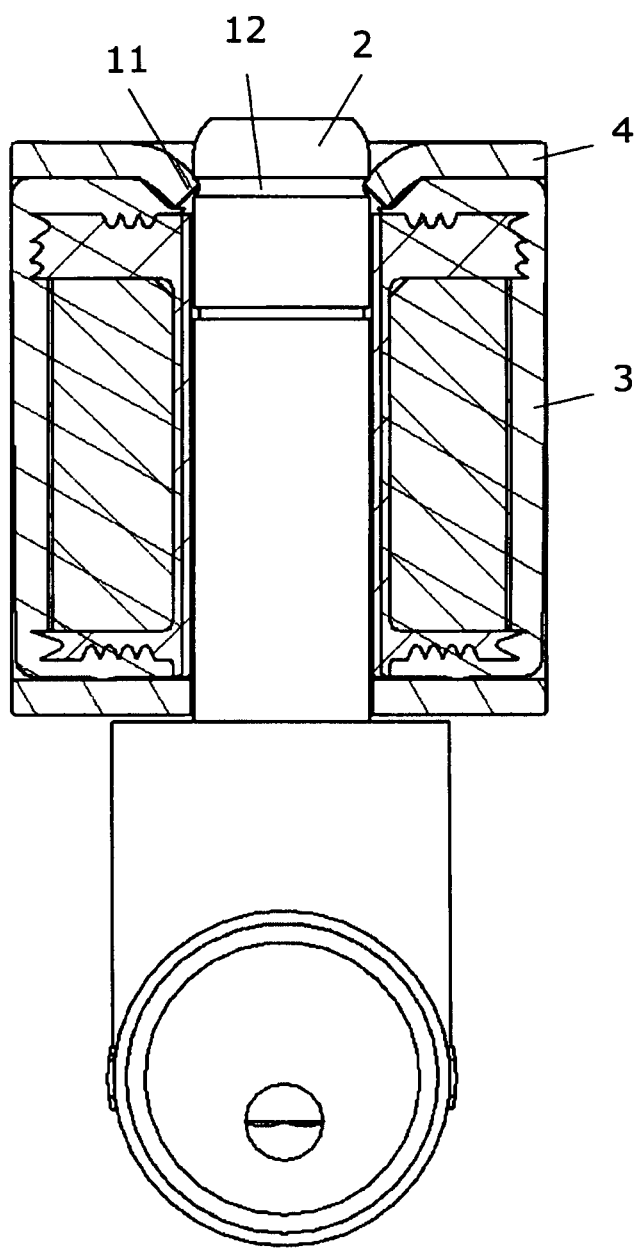
FIG. 3 illustrates the valve in a cross sectional view.

As illustrated in FIG. 3, the yoke 4 comprises a locking structure 11 engaging a recess 12 in the tube. The locking structure 11 thereby prevents removal of not only the yoke 4 but also the solenoid 3 from tube 2.

In the disclosed embodiment, the locking structure 10 has the shape of two pawls 13, 14 with free ends pointing towards each other from opposite sides of the opening 10. Each pawl has a free end pointing inwardly towards the centre of the opening 10. The free end is elastically bendable away from a relaxed configuration so that it can be deformed and provide space for the tube 2 in the opening 10 and so that it can flex back towards the relaxed configuration and into the recess 12 of the tube.

Figure 4:
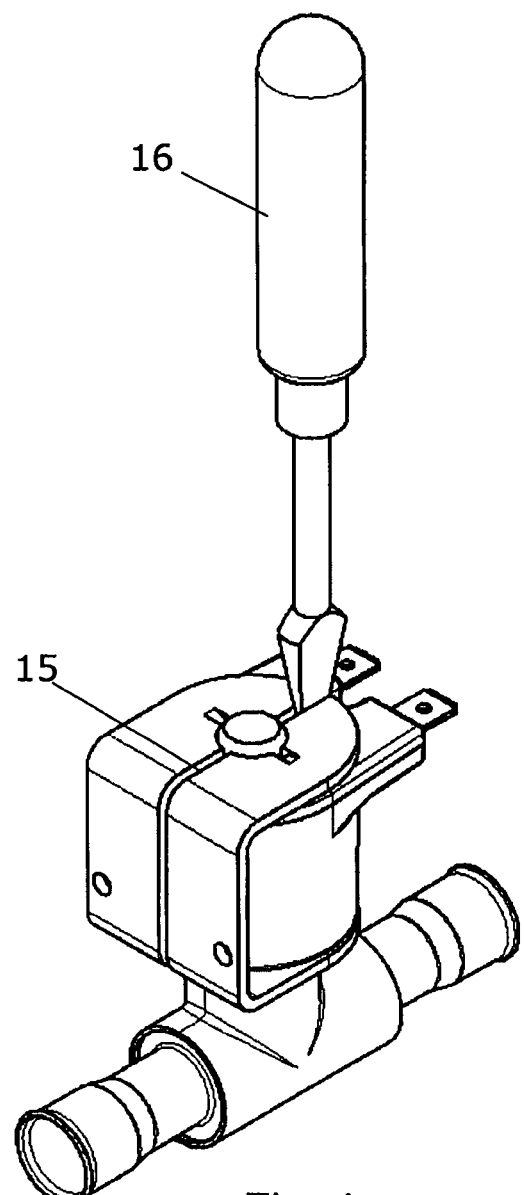
FIG. 4 illustrates one way of releasing the engagement between the yoke and the tube.
Figure 5:
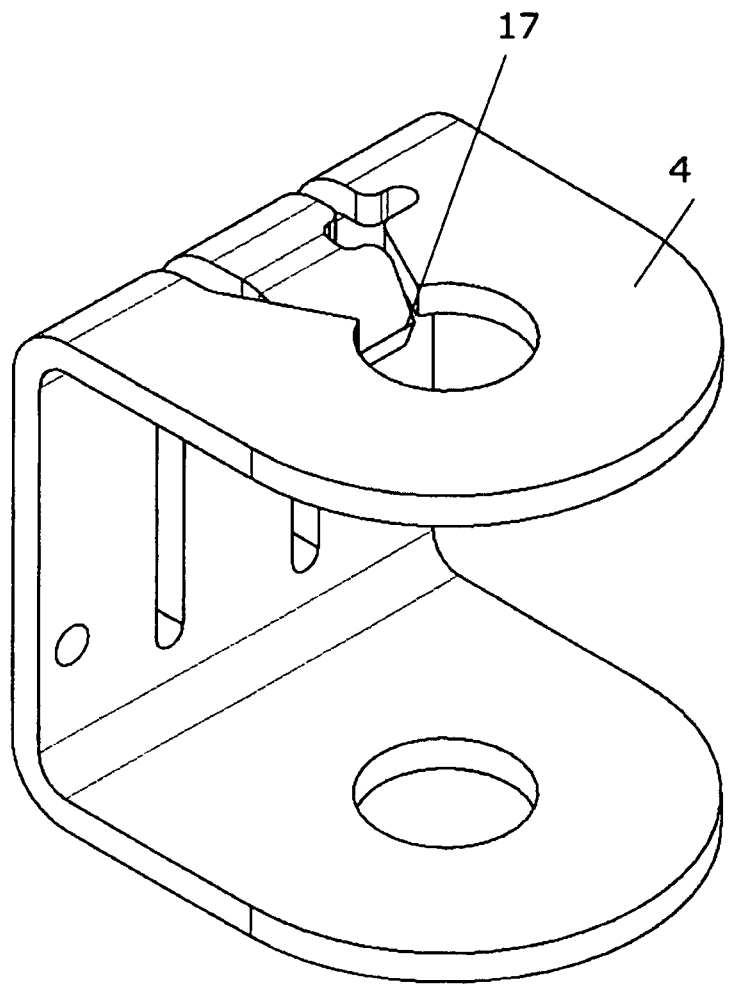
FIG. 5 illustrates an alternative embodiment of the yoke.
Figure 6A:
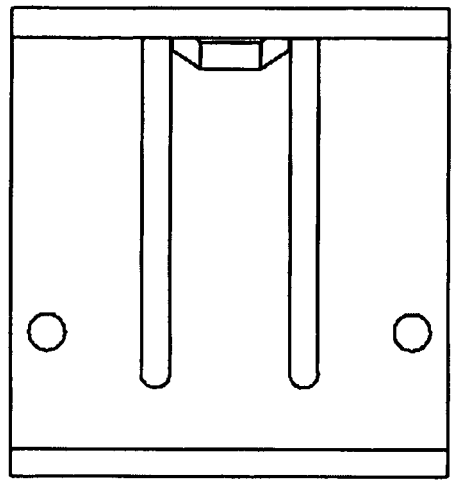
FIGS. 6A and 6B illustrate the yoke in FIG. 5 from different angles.
Figure 6B:
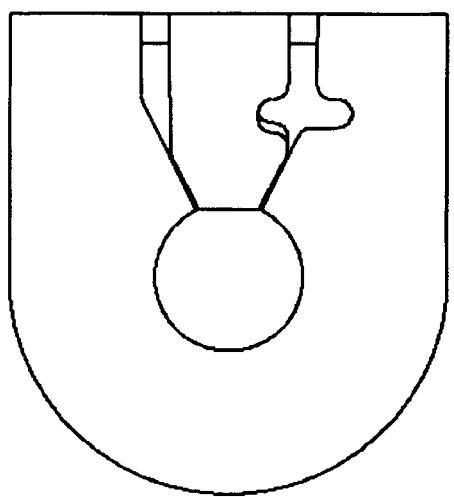
Figure 7:
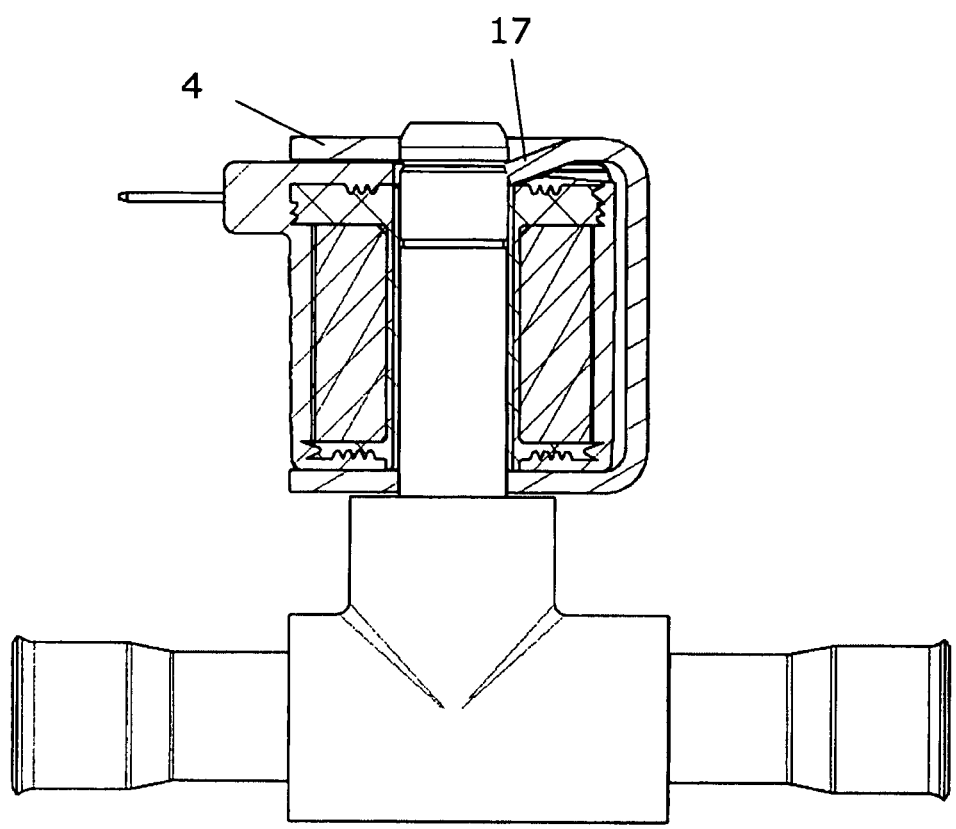
FIGS. 7 and 8 illustrate a valve with the yoke of the alternative embodiment.
Figure 8:
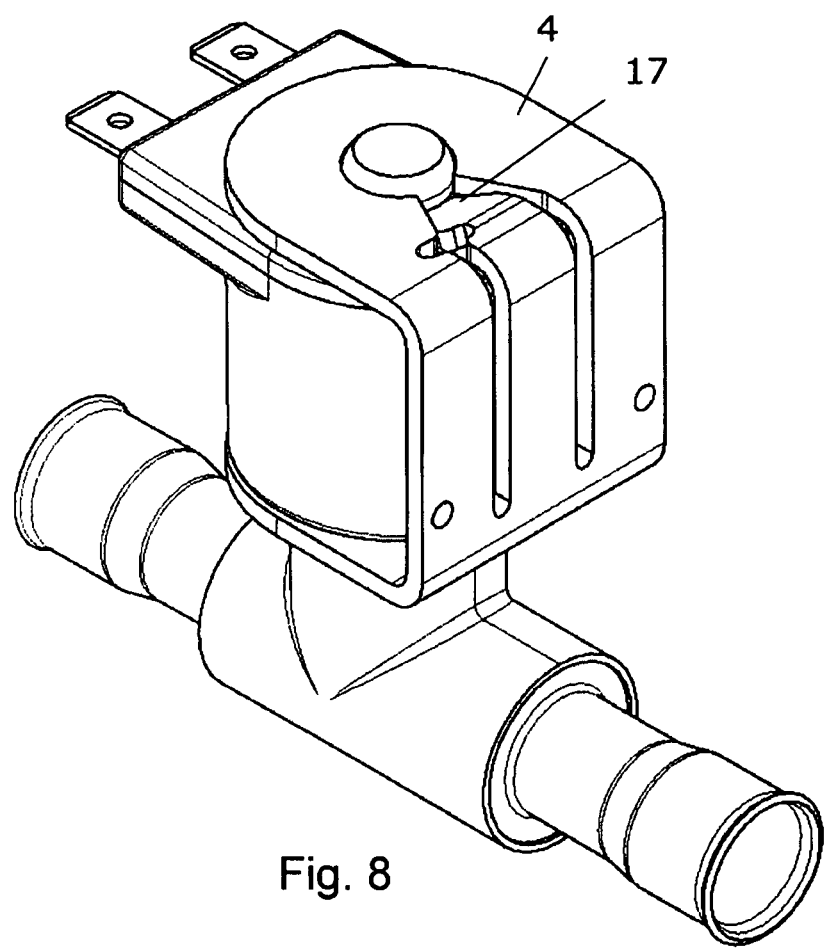

The yoke 4 comprises a slit 15 extending between the opening 9 in the lower leg and the opening 10 in the upper leg. FIG. 4 illustrates how the valve can be disassembled by using a screwdriver 16 placed in the slit 15 to push the two half parts of the yoke away from each other and thereby to pull the pawls out of the groove 12 so the guide tube can be pulled out of the solenoid.

Figure 9:
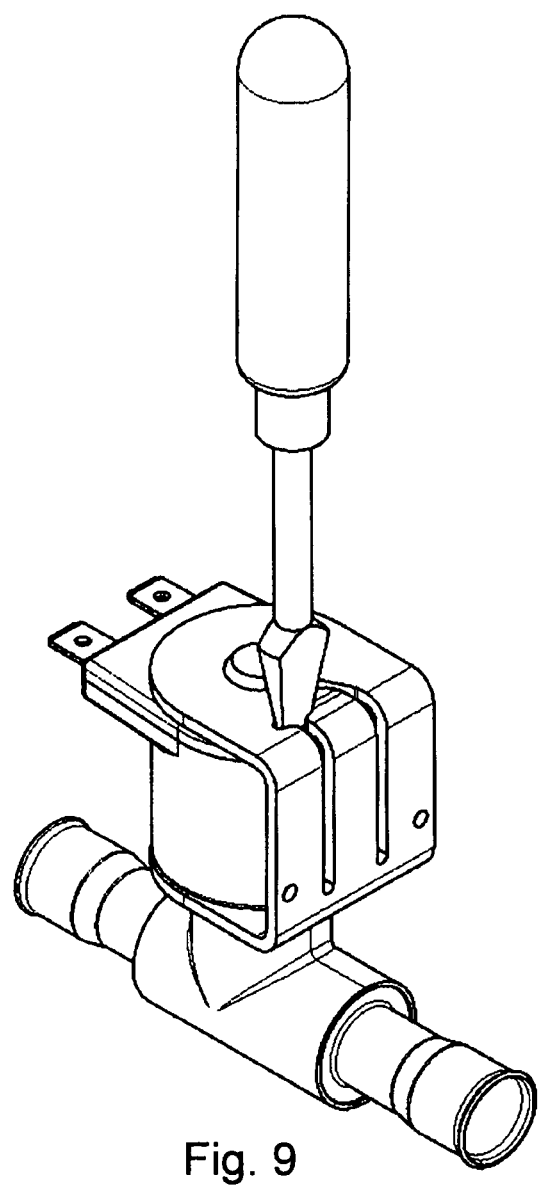
FIG. 9 illustrates releasing of the yoke by use of a screwdriver.
Figure 10A:
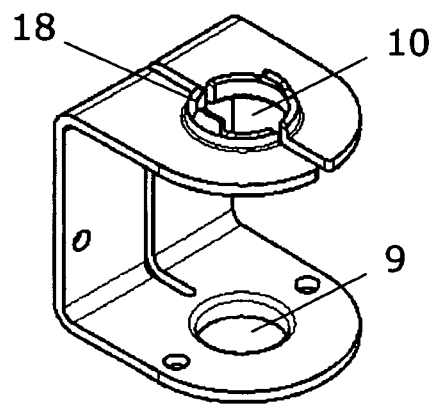
FIGS. 10A, 10B and 10C illustrate another alternative embodiment of the yoke seen from different angles
Figure 10B:
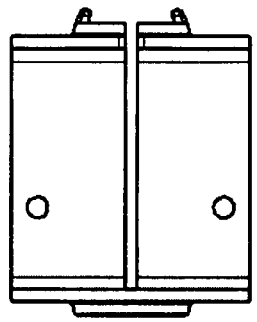
Figure 10C:
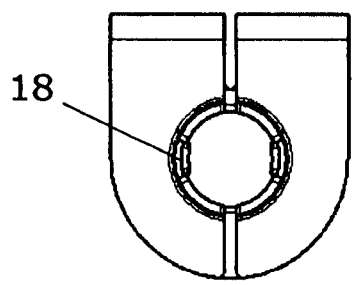
Figure 11:
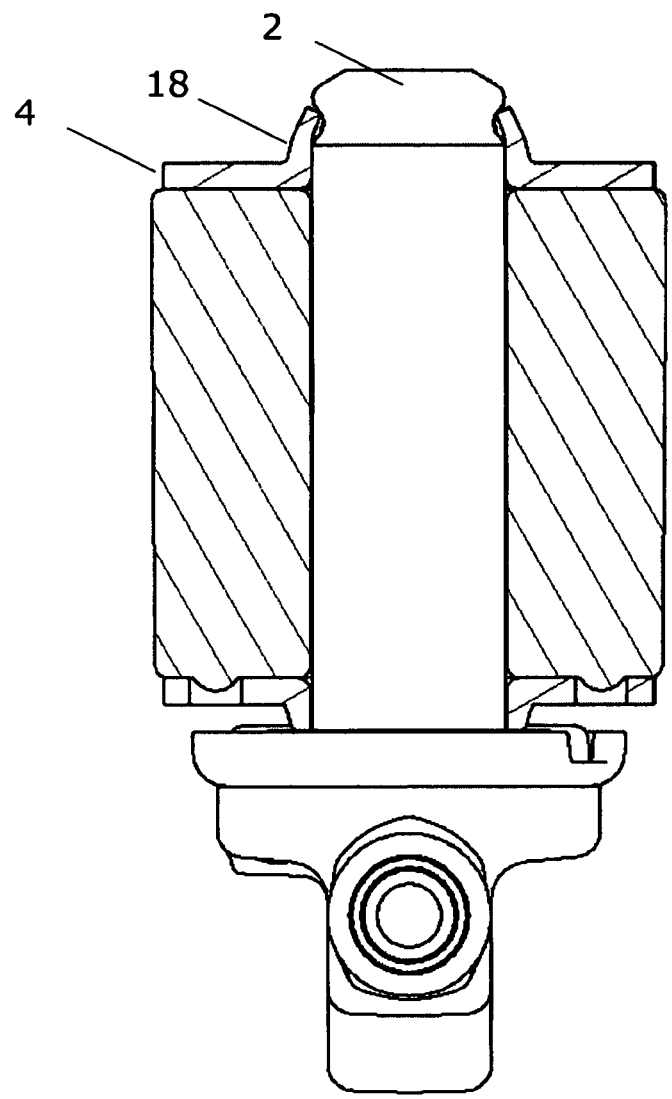
FIGS. 11 and 12 illustrate the valve from FIGS. 10A, 10B and 10C with teeth's of the yoke fixed in a groove in the tube.
Figure 12:
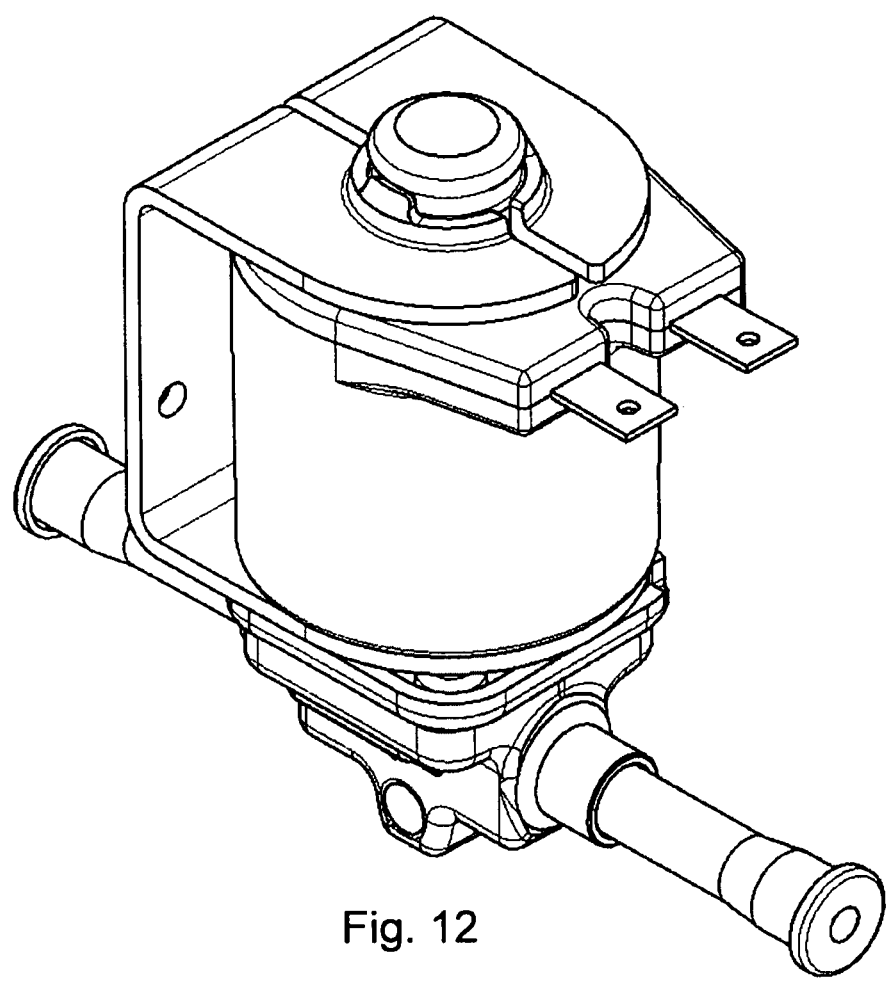
Figure 13:
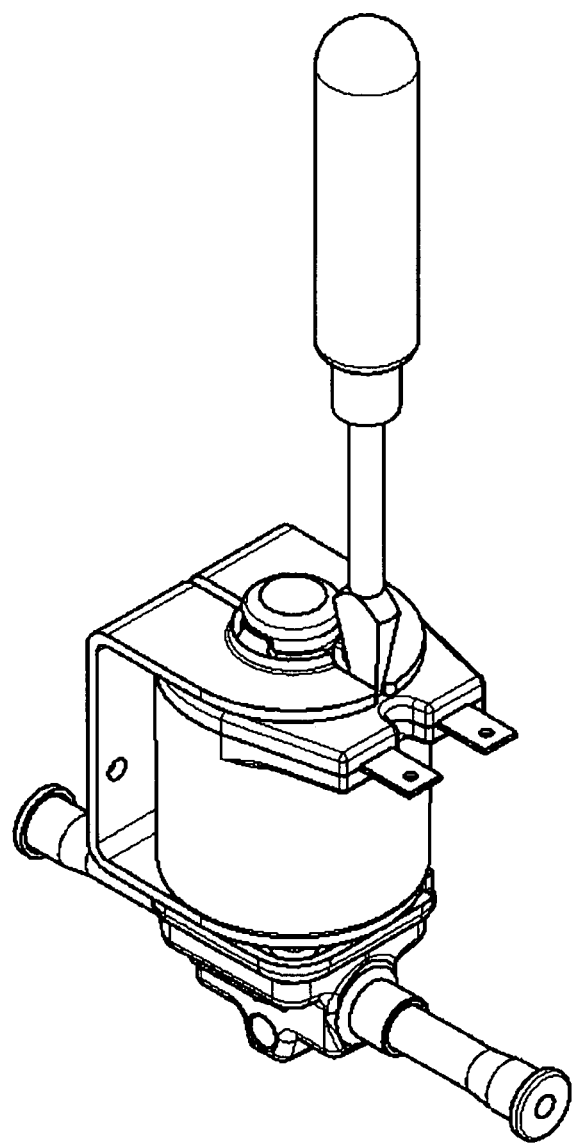
FIG. 13 illustrates one way of releasing the engagement between the yoke and the tube of FIGS. 11 and 12.
Figure 14A:
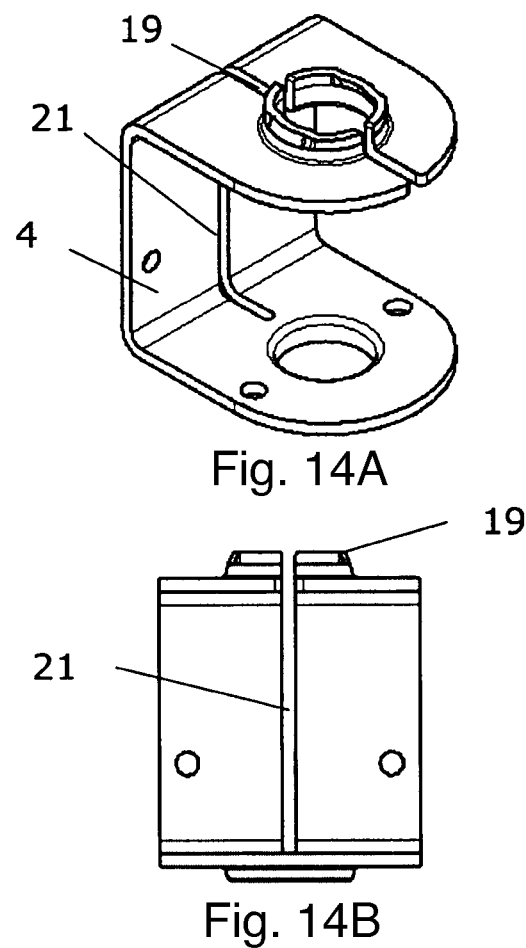
FIGS. 14A, 14B and 14C illustrate another alternative embodiment of the yoke seen from different angles.
Figure 14B:
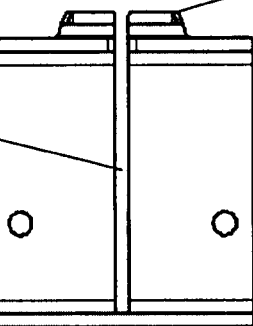
Figure 14C:
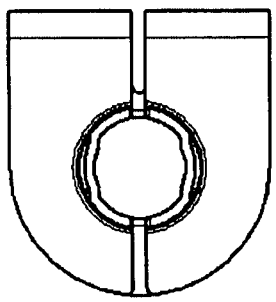
Figure 15:
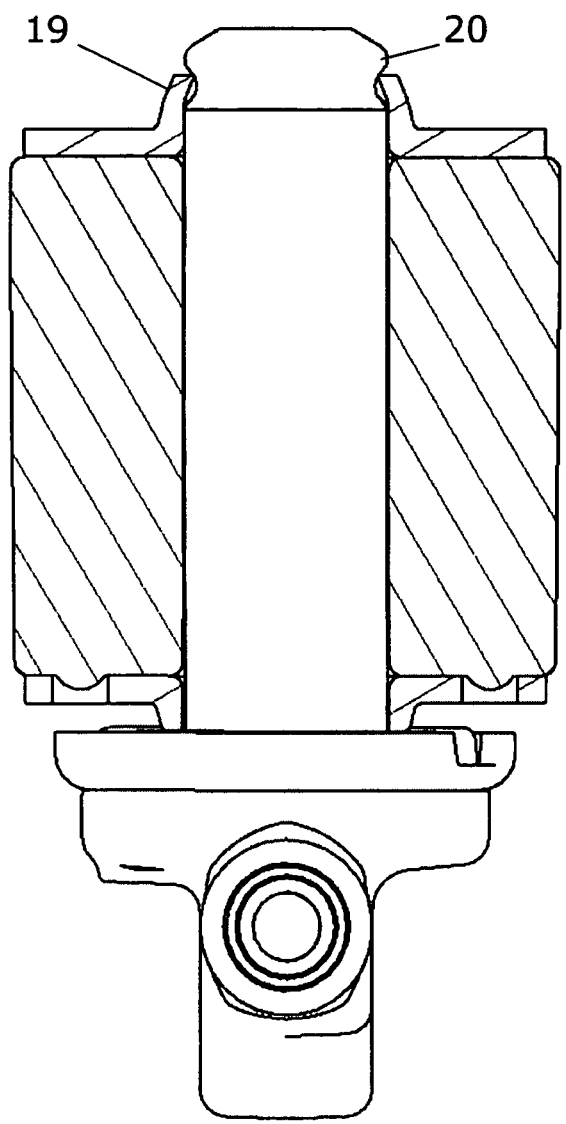
FIGS. 15 and 16 illustrate the valve from FIGS. 14A, 14B and 14C with teeth's of the yoke fixed in a groove in the tube.
Figure 16:
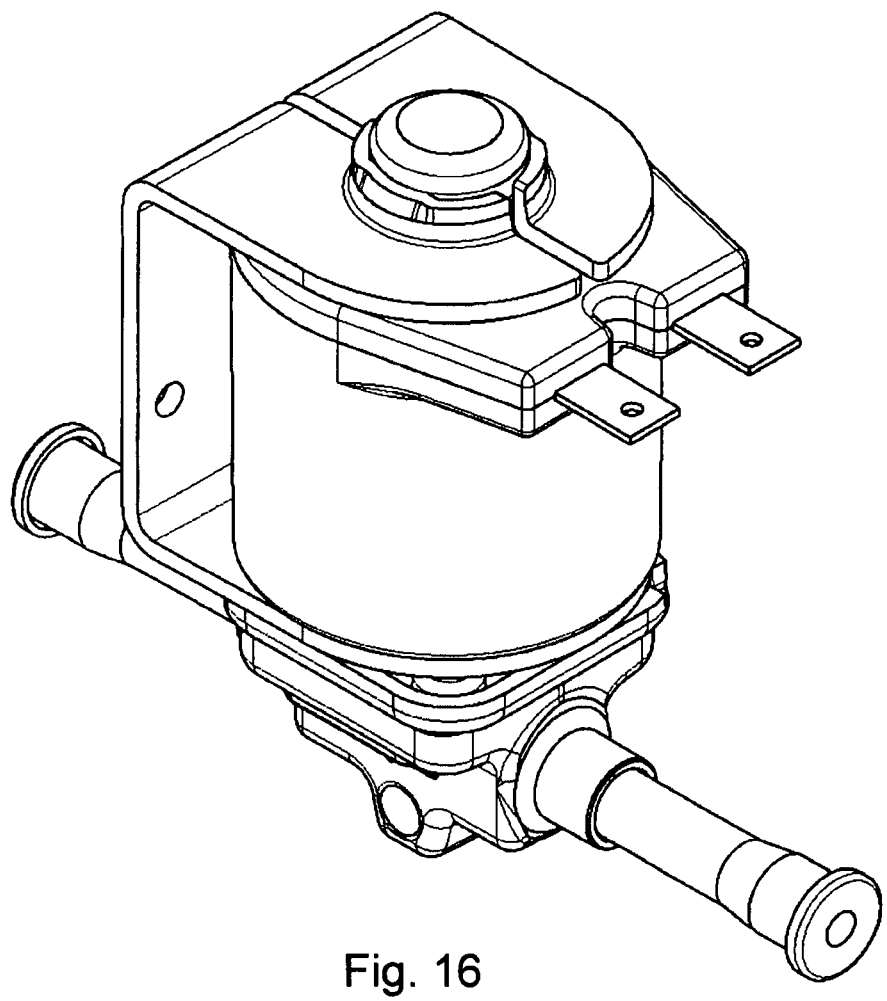
Figure 17:
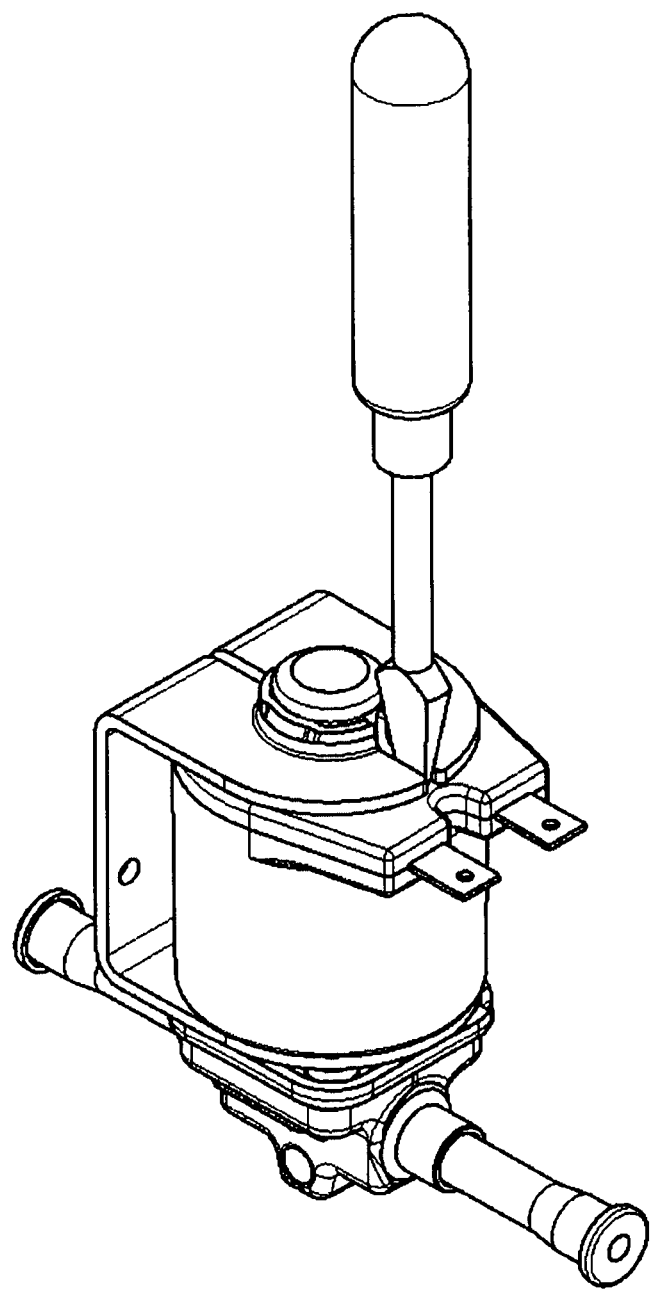
FIG. 17 illustrates one way of releasing the engagement between the yoke and the tube of FIGS. 15 and 16.

FIGS. 5-8 illustrate a valve with an alternative embodiment of the yoke 4 only provided with a single pawl 17 which is elastically deformable to enable locking and release of a tube. FIG. 9 illustrates a screw driver used for release of the yoke 4.

FIGS. 10A-13 illustrate a valve with another alternative embodiment of the yoke 4. In this case, the locking structure is formed at least partly by a toothed peripheral edge 18 around one of the openings 10 in the yoke. The tube can be released by widening of the opening by use of a screwdriver inserted in the slit.

FIGS. 14A-17 illustrate an embodiment of the valve wherein the yoke comprises a locking edge 19 circumferential about the opening 10. Elastic properties of the yoke provides a variable dimension of the opening and therefore allows, in an expanded state of the opening, insertion of the tube in the opening and, in a less expanded state of the opening, engagement between the edge of the opening and the tube. In the illustrated embodiment, the edge 19 engages a recess 20 in the tube. The elastically deformable properties of the yoke are in this case provided by the slit 21 and not by the edge around the opening 10. The area of the opening 10 can be widened by use of a screwdriver.

Although the invention above has been described in connection with preferred embodiments of the invention, it will be evident for a person skilled in the art that several modifications are conceivable without departing from the invention as defined by the following claims.

What is claimed is:

1. A valve comprising a tube for guiding movement of a plunger, a solenoid which can be arranged about the tube, and a yoke which can be positioned in an operational position relative to the tube and relative to the solenoid so that it provides a magnetic path between the solenoid and portions of the tube, wherein the yoke comprises an elastically deformable structure allowing elastic deformation of the yoke to facilitate engaging between the yoke and the tube and thus to prevent removal of the solenoid and the yoke from the tube, and to enable subsequent release of the yoke from the tube to allow disassembly of the valve from the tube, and wherein the yoke forms a lower leg, an intermediate portion and an upper leg, the lower and upper legs both forming openings being aligned to form a passage for the tube through both openings, wherein the yoke comprises a locking structure arranged such that the locking structure, in the operational position, can enter into a recess in the tube and thereby prevent movement of the tube relative to the yoke, and wherein the locking structure is elastically deformable to enable movement of the locking structure into and out of the engagement with the tube to facilitate release and re-locking of the yoke from the tube, wherein the tube is received in an opening through the yoke, where elastic properties of the yoke provide a variable dimension of the opening and allow, in an expanded state of the opening, insertion of the tube in the opening and, in a less expanded state of the opening, engagement between the edge of the opening and the tube, and wherein the locking structure has the shape of two pawls with free ends pointing towards each other from opposite sides of the opening, where each pawl has a free end pointing inwardly towards the centre of the opening, and where the free end is elastically bendable away from a relaxed configuration so that it can be deformed and provide space for the tube in the opening and so that it can flex back towards the relaxed configuration and into the recess of the tube.

2. The valve according to claim 1, wherein the yoke is arranged about the solenoid and thereby fixes the solenoid to the tube.

3. The valve according to claim 1, wherein the locking structure has a free end which extends towards the opening in one of the legs, the free end being elastically deformable so that it can be received in a recess in the tube and thereby prevent the yoke from moving along the tube.

4. The valve according to claim 1, wherein the tube, in the operational position, extends through both openings and a free end of the tube extends upwardly from the upper leg.

5. The valve according to claim 3, wherein the locking structure is arranged at the opening in the upper leg.

6. The valve according to claim 2, wherein the free end of the locking structure is formed at least partly by a peripheral edge around one of the openings in the yoke.

7. The valve according to claim 3, wherein the solenoid is arranged about the tube between the two openings in the yoke.

8. The valve according to claim 3, wherein at least one of the two openings can be expanded by elastic deformation of a portion of the yoke.

9. The valve according to claim 3, wherein the yoke forms a slit extending between the opening in the lower leg and the opening in the upper leg.

10. A method of making a valve in which a plunger is movable in a tube under influence of a solenoid, the method comprising providing a yoke which can be positioned in an operational position relative to the tube and relative to the solenoid in which position it provides a magnetic path between the solenoid and portions of the tube wherein the yoke is provided as an elastically deformable structure allowing elastic deformation of the yoke so that it, in the operational position, can engage into a recess of the tube and thereby prevent removal of the solenoid from tube, and wherein the yoke is provided with a lower leg, an intermediate portion and an upper leg, the lower and upper legs both forming openings being aligned to form a passage for the tube through both openings, and wherein a locking structure is elastically deformed when moving the locking structure into and out of engagement with the tube to facilitate release and re-locking of the locking structure of the yoke from the recess of the tube, wherein the locking structure has the shape of two pawls with free ends pointing towards each other from opposite sides of the opening, where each pawl has a free end pointing inwardly towards the centre of the opening, and where the free end is elastically bend away from a relaxed configuration and being deformed, providing space for the tube in the opening, and where the free end subsequently flexes back towards the relaxed configuration and into the recess of the tube, locking the tube to the opening.

* * * * *